United States Patent [19]

Ogura et al.

[11] Patent Number: 4,823,898

[45] Date of Patent: Apr. 25, 1989

[54] MOUNT FOR A STEERING GEAR BOX

[75] Inventors: Masami Ogura; Kazuhiro Seki; Masaru Abe; Mitsuya Serizawa; Yoshimichi Kawamoto; Toru Yasuda; Takashi Kohata, all of Saitama, Japan

[73] Assignee: Honda Giken Kogyo Kabushiki Kaisha, Tokyo, Japan

[21] Appl. No.: 170,829

[22] Filed: Mar. 21, 1988

[30] Foreign Application Priority Data

| Feb. 12, 1986 | [JP] | Japan | 61-19095 |
| Feb. 12, 1986 | [JP] | Japan | 61-19096 |
| Aug. 20, 1986 | [JP] | Japan | 61-126941 |
| Dec. 16, 1986 | [JP] | Japan | 61-203408 |

[51] Int. Cl.$^4$ .............................................. B62D 15/00
[52] U.S. Cl. ....................................... 180/140; 74/422; 74/499; 74/583; 180/143; 180/148; 280/89; 280/91
[58] Field of Search ................. 180/79, 140, 141, 142, 180/143, 148; 280/89, 91, 90; 74/422, 499, 583

[56] References Cited

U.S. PATENT DOCUMENTS

| 4,540,059 | 9/1985 | Shibahata et al. | 180/148 X |
| 4,546,839 | 10/1985 | Noguchi | 180/142 |
| 4,634,135 | 1/1987 | Nakata et al. | 180/148 X |

FOREIGN PATENT DOCUMENTS

172114 8/1952 Fed. Rep. of Germany .
1412900 11/1975 United Kingdom .

Primary Examiner—Charles A. Marmor
Assistant Examiner—Mitchell J. Hill
Attorney, Agent, or Firm—Irving M. Weiner; Joseph P. Carrier; Pamela S. Burt

[57] ABSTRACT

A steering gear box mount includes a resilient member interposed between a motor vehicle body and a steering gear box for allowing movement of the steering gear box. The mount also has a structure for limiting allowed movement of the steering gear box. The structure includes a mechanism for selectively fixing the steering gear box to a motor vehicle body, or a mechanism for continuously adjusting the allowed movement of the steering gear box.

7 Claims, 7 Drawing Sheets

MOUNT FOR A STEERING GEAR BOX

This is a divisional of application Ser. No. 013,283 filed Feb. 11, 1987 pending.

BACKGROUND OF THE INVENTION

1. Field of the Invention

The present invention relates to a mount for supporting a steering gear box on a motor vehicle body.

2. Description of the Relevant Art:

In automobiles, it is general practice to mount a steering gear box on an automobile body through a damping member such as of rubber in order to prevent external forces such as a lateral wind or a road shock from being transmitted as vibration to a steering wheel while the automobile is traveling.

Where such a mount structure is employed, however, the maneuvering or steering response is somewhat lowered since the steering gear box is supported on the automobile body with relatively low rigidity. If the steering gear box were rigidly secured to the automobile body, the steering response would be increased, but external forces would be more likely transmitted to the steering wheel.

The present invention has been made to meet both of the above contradictory requirements for mounting a steering gear box on a motor vehicle body. In other words, the present invention increases; the steering response and prevent external forces from being transmitted to a steering wheel.

SUMMARY OF THE INVENTION

According to the present invention, there is provided a steering gear box mount comprising a steering gear box, a motor vehicle body, a first resilient member interposed between the motor vehicle body and a portion of the steering gear box for allowing the steering gear box to move, and means interposed between the motor vehicle body and another portion of the steering gear box for limiting the allowed movement of the steering gear box.

It is an object of the present invention to provide a mount for supporting a steering gear box on a motor vehicle body, the mount being capable of changing the rigidity with which the steering gear box is supported on the motor vehicle body.

The supporting rigidity of the mount according to the present invention may be varied continuously, or may be varied between two states, i.e., a movable state and a fixed state.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
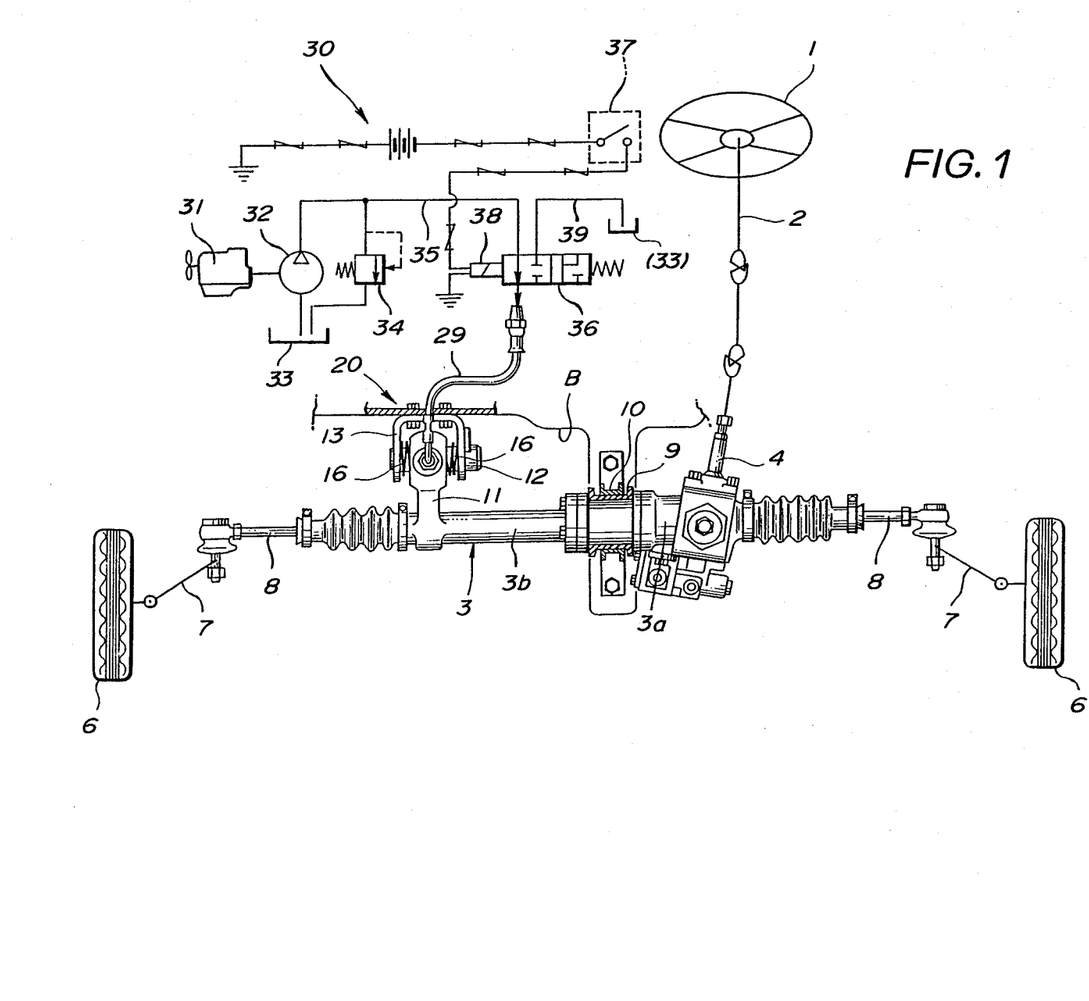
FIG. 1 is a schematic view of a front steering gear box supported on a motor vehicle body by a mount according to a first embodiment of the present invention, the view also showing components coupled to the front steering gear box and a control system for a supporting rigidity adjusting device.

As shown in FIG. 1, a steering wheel 1 of a motor vehicle such as an automobile is coupled to a steering shaft 2 connected to a pinion shaft 4 of a rack-and-pinion steering gear box 3. A rack shaft 5 (FIG. 2) extending and movable laterally through the gear box 3 has opposite ends joined by respective tie rods 8 to knuckle arms 7 on which respective front wheels 6 are supported. The gear box 3 comprises two members 3a, 3b coupled to each other. The member 3a is mounted on a motor vehicle body B through a rubber damper 9 and a metal band 10. The gear box 3 is allowed by the rubber damper 9 to move to a certain extent with respect to the motor vehicle body B.

Figure 2:
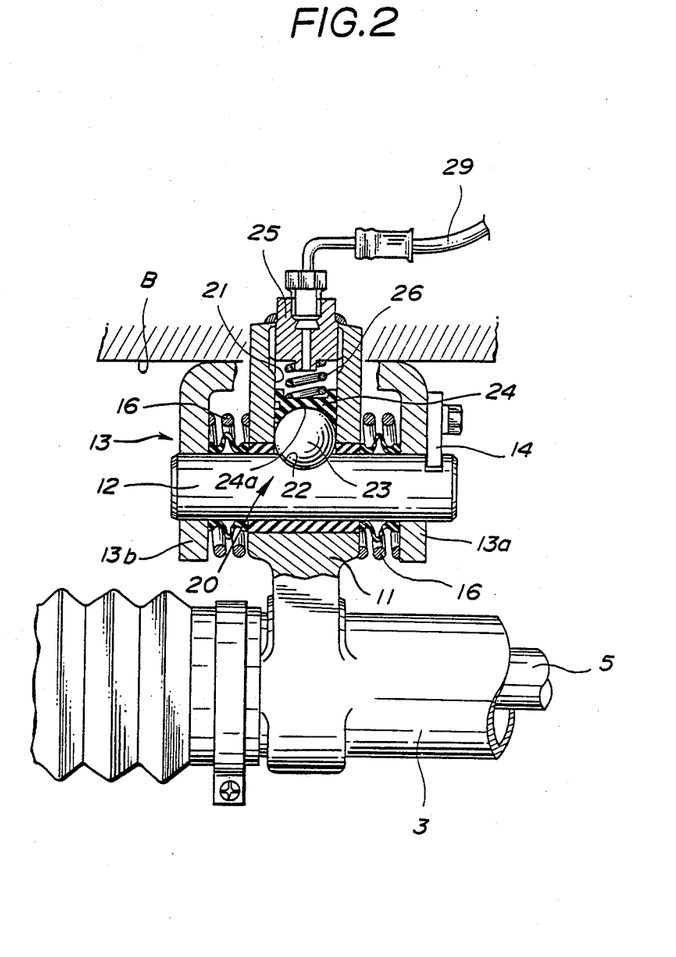
FIG. 2 is an enlarged fragmentary elevational view, partly in cross section, of the mount of FIG. 1.

The other member 3b of the steering gear box 3 has a radial arm 11 by which a device 20 for adjusting the supporting rigidity of the gear box 3 is mounted. More specifically, as shown in FIG. 2, a support pin 12 is slidably inserted transversely through the radial arm 11. The support pin 12 has opposite ends supported on legs 13a, 13b of a bifurcated bracket 13 fixed to the motor vehicle body B. The support pin 12 is locked against rotation by means of a stopper 14 disposed on the outer side of one of the legs 13a. The radial arm 11 has a cylinder 21 defined in its distal end portion and extending perpendicularly to the support pin 12. The support pin 12 has a partly spherical recess 22 defined in a portion thereof facing into the cylinder 21. A steel ball 23 is housed in the cylinder 21 and has a peripheral portion seated in the recess 22. The cylinder 21 also houses a piston 24 having a partly spherical recess 24a in which another peripheral portion of the steel ball 23 is received. The cylinder 21 has an opening in which a plug 25 is threaded, with a compression coil spring 26 interposed between the plug 25 and the piston 24.

Two compression coil springs 16 are interposed between the radial arm 11 and the legs 13a, 13b of the bracket 13.

The cylinder 21 is connected to an oil supply/discharge passage 29. The oil supply/discharge passage 29 is generally shown in FIG. 1 as being coupled to the radial arm 11, and more specifically shown in FIG. 2 as being coupled to the plug 25. The supporting rigidity adjusting device 20 thus constructed is controlled in its operation by a control system 30.

As illustrated in FIG. 1, the control system 30 includes a directional control valve 36 connected between the oil supply/discharge passage 29 and another oil supply/discharge passage 35 through which oil under pressure flows from a pump 32 driven by an engine 31. The directional control valve 36 is shifted in its position by a solenoid 38 which is selectively energized and de-energized by a manual switch 37. When the directional control valve 36 is in the illustrated position (FIG. 1), the oil under pressure is supplied from the passage 35 through the passage 29 into the cylinder 21. When the directional control valve 36 is shifted to the left, the oil under pressure is returned from the cylinder 21 via an oil passage 39 into an oil tank 33. The directional control valve 36 may be automatically shifted dependent on the speed of travel of the motor vehicle. The oil under pressure thus employed in the control system 30 is introduced from a power steering device or the like of the motor vehicle.

When the oil under pressure is supplied into the cylinder 21, the piston 24 is moved forwardly to press the steel ball 23 into the recess 22 for thereby more rigidly securing the steering gear box 3 to the motor vehicle body B. Therefore, the steering response may be thus increased for better maneuverability especially in medium- and low-speed ranges of the motor vehicle.

As the oil under pressure is discharged from the cylinder 21, the steel ball 23 remains seated in the recess 22 only under the resiliency of the coil spring 26. Therefore, the steering gear box 3 is movable to a certain extent with respect to the motor vehicle body B under the resiliency of the coil spring 26, the coil springs 16, and the rubber damper 9. External forces applied to the motor vehicle can thus be absorbed by the steering gear box 3, allowing the motor vehicle to run straight particularly in a high-speed range.

Figure 3:
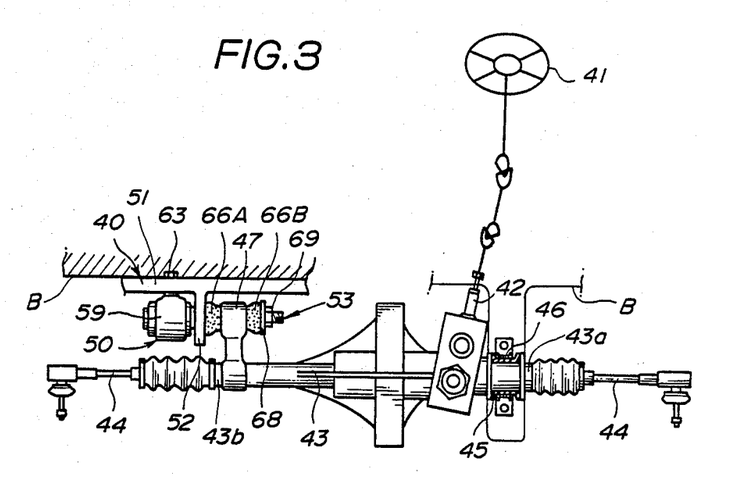
FIG. 3 is a schematic view of a front steering gear box supported on a motor vehicle body by a mount according to a second embodiment of the present invention.
Figure 4:
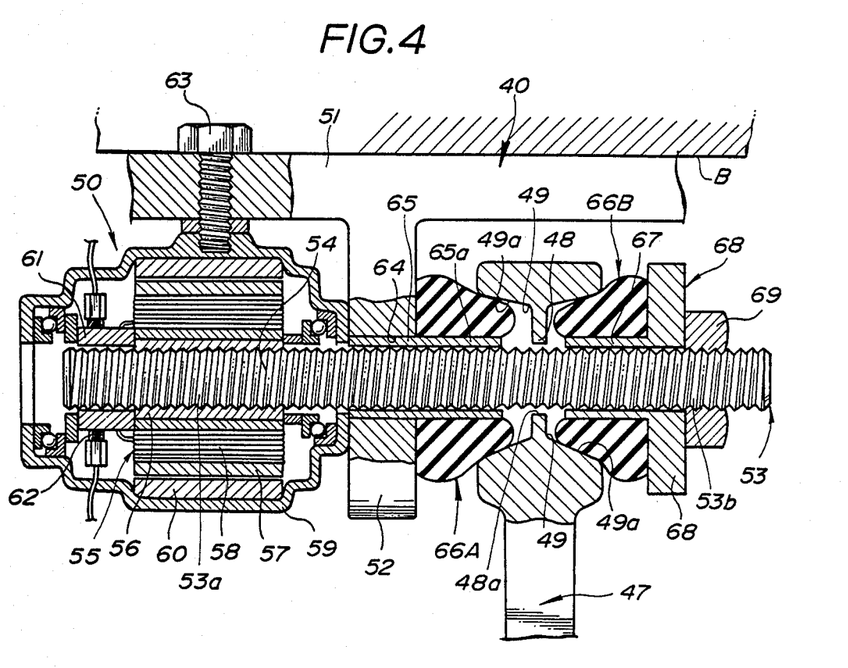
FIG. 4 is an enlarged cross-sectional view of the mount of FIG. 3.

FIG. 3 and 4 show a gear box mount according to a second embodiment of the present invention. While in the first embodiment the supporting rigidity with which the gear box is mounted on the motor vehicle body is adjustable in two states, i.e., a movable state and a fixed state, the supporting rigidity is continuously variable in the second embodiment.

As illustrated in FIG. 3, a steering gear box 43 accommodating a rack and pinion (not shown) therein has an end 43a near a pinion shaft 42 coupled to a steering wheel 41. The end 43a of the steering gear box 43 is mounted on a motor vehicle body B by a metal band 46 with a rubber damper 45 interposed therebetween. Therefore, the steering gear box 43 is movable to a certain extent with respect to the motor vehicle body B.

The steering gear box 43 has a radial arm 47 near the opposite end 43b thereof. Between the radial arm 47 and the motor vehicle body B, there is interposed a device 40 for adjusting the supporting rigidity of the gear box 43, the device 40 including a bracket 51 secured to the motor vehicle body B. The bracket 51 has an upstanding wall 52 extending the secured base thereof substantially parallel to the radial arm 47 of the gear box 43. A screw shaft 53 extends through and between the upstanding wall 52 and the radial arm 47.

As clearly shown in FIG. 4, the screw shaft 53 has external screw threads 54 over the entire length thereof, and includes an end portion 53a (shown on the lefthand side in FIG. 4) extending from the upstanding wall 52 remotely from the radial arm 47. An actuator 50 comprising an electric motor for axially moving the shaft 53 has a rotor 55 having internal screw threads 56 threaded over the end portion 53a of the screw shaft 53. The rotor 55 of the motor 50 comprises an iron core 57 and armature windings 58 wound around the iron core 57. The rotor 55 also includes a commutator 61 positioned at the outer (left) end of the rotor 55 and fixed to the iron core 57. The motor 50 has a housing 59 serving as a stator and permanent magnets 60 fixed to the inner peripheral surface of the housing 59. The permanent magnets 60 are spaced from the outer peripheral surface of the rotor 50 by a small gap. The housing 59 supports thereon brushes 62 held in contact with the commutator 61 at all times. The housing 59 is fastened to the bracket 51 by a bolt 63.

The wall 52 of the bracket 51 has a hole 64 defined therethrough and through which the shaft 53 extends. A sleeve 65 is fitted in the hole 64 and has an extension 65a extending to a position near the radial arm 47 of the gear box 43. A rubber damper 66A is fitted over the sleeve extension 65a, the rubber damper 66A being tapered to the right toward the radial arm 47.

The shaft 53 has an opposite end portion 53b remote from the end portion 53a and on which a sleeve 67 is mounted. A rubber damper 66B which is tapered to the left toward the radial arm 47 is fitted over the sleeve 67. The sleeve 67 has a flange 68 on its outer end (on the righthand side as shown). The end portion 53b has a shaft end projecting beyond the flange 68, with a nut 69 threaded over the shaft end. The shaft 53 extends through and is movable through the sleeves 65, 67.

The rubber damper 66A on the sleeve 65 and the rubber damper 66B on the sleeve 67 cooperate with each other in sandwiching the radial arm 47 therebetween. The radial arm 47 has opposite recesses 49 having respective inner peripheral surfaces 49a flaring outwardly for pressed engagement with the tapered ends of the rubber dampers 66A, 66B. The radial arm 47 also includes a web 48 serving as a common bottom of the recesses 49 and having a hole 48a through which the shaft 53 extends with a clearance therearound.

The supporting rigidity adjusting device 40 thus constructed operates as follows: The motor 50 may be manually started or automatically started dependent on the running conditions of the motor vehicle. When the motor 50 is started, the rotor 55 is rotated to cause the threads 56 thereof engaging with the threads 54 of the shaft 53 to move the shaft 53 axially. The sleeve 67 supporting the rubber damper 66B is prevented by the nut 69 from moving to the right (FIG. 4) on the shaft 53. Therefore, when the shaft 53 is moved to the left, the sleeve 67 is also moved to the left with the shaft 53, reducing the distance between the flange 68 of the sleeve 67 and the wall 52 of the bracket 51. The rubber dampers 66A, 66B with the radial arm 47 sandwiched therebetween are elastically compressed to continuously increase the rigidity with which the radial arm 47 is supported on the bracket 51. Upon reverse rotation of the rotor 55, the shaft 53 is axially moved to the right (FIG. 4) for thereby causing the flange 68 to be pressed against the nut 69 under the resiliency of the rubber dampers 66A, 66B. The flange 68 is therefore moved with the shaft 53, increasing the distance between the flange 68 and the wall 52. The rigidity of the rubber dampers 66A, 66B is now progressively lowered.

In the second embodiment as described above, in order for the rigidity of the rubber dampers 66A, 66B by which the gear box 43 is resiliently supported on the motor vehicle body B to be continuously variable, the flange or movable member 68 held against the rubber dampers is disposed on only one side of the radial arm 47 of the gear box 43. Therefore, as the movable member 68 is moved, the rubber dampers 66A, 66B are pressed or released on only one side thereof, and the radial arm 47 of the gear box 43 which is located centrally between the rubber dampers 66A, 66B is moved upon compression and expansion of the rubber dampers 66A, 66B. Consequently, the gear box 43 is slightly moved along the shaft 53 each time the rigidity of the rubber dampers 66A, 66B is adjusted.

Figure 5:
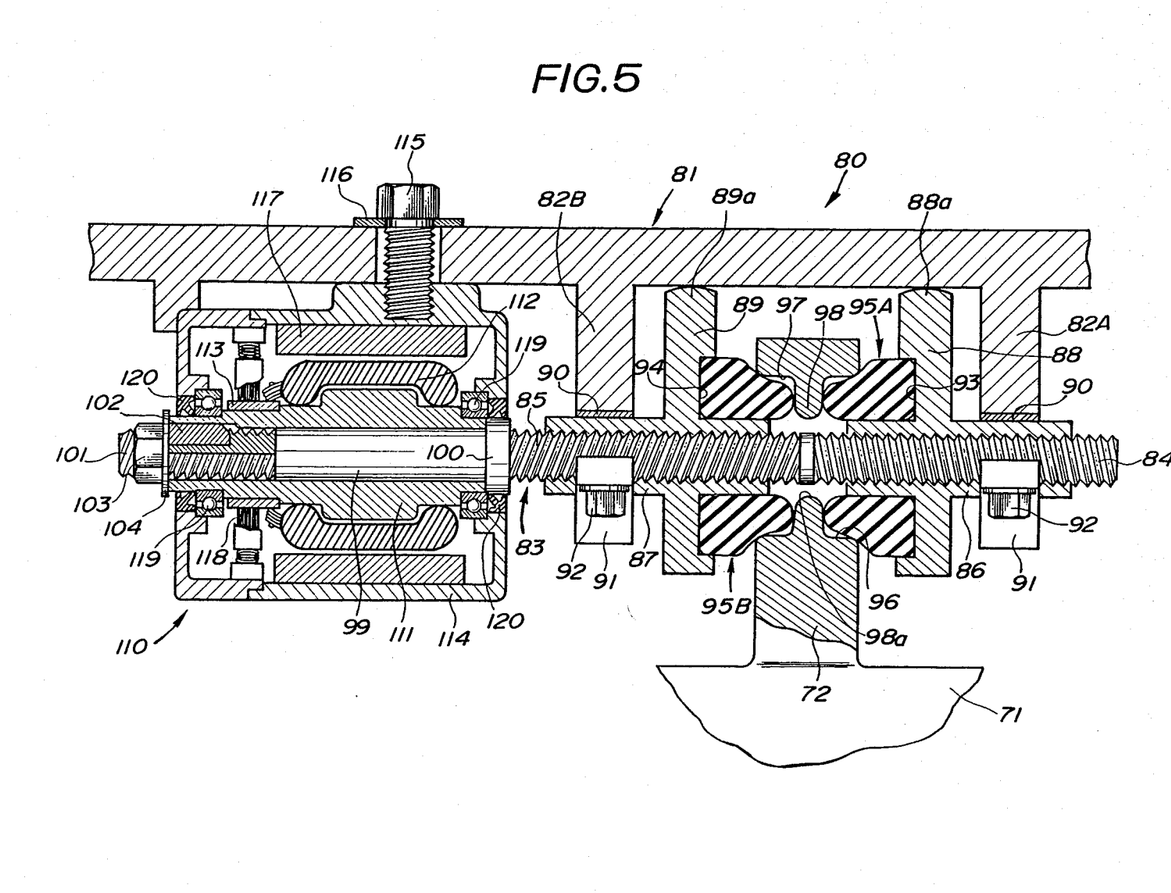
FIG. 5 is an enlarged cross-sectional view of a mount according to a third embodiment of the present invention.

According to a third embodiment shown in FIG. 5, two movable members are disposed outwardly of a pair of rubber dampers, respectively, sandwiching therebetween a radial arm integral with a gear box, and are movable back and forth on a shaft while holding the radial arm in a substantially central position therebetween at all times through the rubber dampers. Thus, the gear box is prevented from moving when the rigidity of the rubber dampers is adjusted. More specifically, as shown in FIG. 5, a radial arm 72 is integrally formed with a steering gear box 71, which is supported by the radial arm 72 on a motor vehicle body. A device 80 for adjusting the supporting rigidity of the gear box is interposed between the radial arm 72 and the motor vehicle body. The device 80 includes a bracket 81 fixed to the motor vehicle body and extending substantially perpendicular to the radial arm 72. The bracket 81 has two upstanding walls 82A, 82B spaced equidistantly from and positioned on the opposite sides of the radial arm 72. A screw shaft 83 extends through the walls 82A, 82B and the radial arm 72.

The screw shaft 83 has threaded portions 84, 85 which are externally threaded in opposite directions, the threaded portion 84 extending from one end (righthand end in FIG. 5) of the shaft 83 through the wall 82A to the radial arm 72 and the other threaded portion 85 extending from the radial arm 72 to and beyond the wall 82b. Sleeves 86, 87 are threaded over the threaded portions 84, 85, respectively, the sleeves 86, 87 having radially outward flanges 88, 89, respectively, on their intermediate portions. The sleeves 86, 87 extend respectively through the walls 82A, 82B and are slidable with respect thereto through respective plain bearings 90. The plain bearings 90 are held in position by separable bearing holders 91, respectively, fixed by bolts 92 to the walls 82A, 82B. The flanges 88, 89 are positioned between the radial arm 72 and the walls 82A, 82B, i.e., on the opposite sides of the radial arm 72. The flanges 88, 89 have ends 88a, 89a, respectively, extending in sliding contact with the surface of the bracket 81 for preventing the sleeves 86, 87 from rotating around the shaft 83. The flanges 88, 89 have shallow annular cavities 93, 94, respectively, defined in their surfaces facing the radial arm 72 and extending around the sleeves 86, 87. The annular cavities 93, 94 receive therein the bottoms of thick rubber dampers 95A, 95B which are fitted over the sleeves 86, 87, respectively, and tapered toward the radial arm 72. The radial arm 72 has opposite recesses 96, 97 capable of receiving the distal ends of the rubber dampers 95A, 95B, respectively, and a web 98 serving as a common bottom of the recesses 96, 97 and having a hole 98a through which the shaft 83 extends with a sufficient clearance therearound.

The shaft 83 has an axial extension 99 on its opposite end (lefthand end in FIG. 5) portion, the extension 99 being disposed in an electric motor 110 which serves as an actuator for rotating the shaft 83 about its own axis. The extension 99 has a step or flange 100 on its end adjacent to the threaded portion 85 and is externally threaded on its outer end 101. The motor 110 has an iron core 111 fitted over the extension 99 and having one end held against the step 100. The iron core 111 is secured to the shaft 83 for rotation therewith by a key 102 inserted to the opposite outer end thereof, and is prevented from axially moving by a nut 103 threaded over the threaded end 101 of the shaft extension 99 with a washer 104 interposed between the nut 103 and the iron core 111. Armature windings 112 are wound around the iron core 111, and a commutator 113 is mounted on the iron core 111 near its outer end. Permanent magnets 117 are fixed to the inner peripheral surface of a motor housing 114 secured to the bracket 81 by means of a bolt 115 with a washer 116 disposed between the bolt 115 and the bracket 81. Brushes 118 are supported on the housing 114 in sliding contact with the commutator 113. Ball bearings 119 and outer seal members 120 are interposed between the motor housing 114 and the iron core 111.

When the motor 110 is started, the shaft 83 is rotated about its own axis with the iron core 111. The sleeves 86, 87 threaded over the threaded portions 84, 85, respectively, are now moved toward or away from each other. The rubber dampers 95A, 95B interposed between the flanges 88, 89 with the radial arm 72 therebetween are compressed against or released from the opposite sides of the radial arm 72 which acts as a positional reference, so that the rigidity of the rubber dampers 95A, 95B are continuously adjusted or varied.

In the second and third embodiments, the two rubber dampers are employed as a resilient body. However, a single rubber damper may be employed. The actuator for varying the rigidity of the rubber dampers may be of any desired form.

The mount structure with variable supporting rigidity, as described above in the three embodiments, may be employed for supporting a rear steering gear box as well as a front steering gear box of a motor vehicle with steerable front and rear wheels. A system arrangement in which the mount structure of the invention is incorporated in a motor vehicle with steerable front and rear wheels will be described below.

Figure 6:
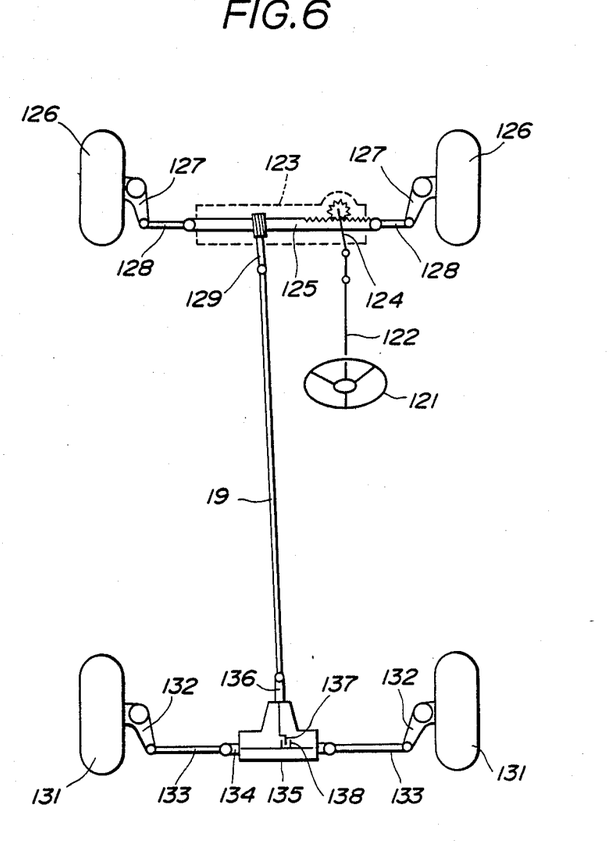
FIG. 6 is a schematic view of a front and rear wheel steering apparatus.

FIG. 6 schematically shows a front and rear wheel steering apparatus. A steering shaft 122 coupled to a steering wheel 121 is connected to a pinion shaft 124 in a rack-and-pinion front steering gear box 123. The front steering gear box 123 houses a rack shaft 125 movable laterally therein and having opposite ends coupled by tie rods 128 to knuckle arms 127 on which respective front wheels 126 are rotatably supported. The front steering gear box 123 also has an output pinion shaft 129 for transmitting a steering force to a rear wheel steering mechanism, the pinion shaft 129 meshing with the rack shaft 125.

Rear wheels 131 are rotatably supported respectively on knuckle arms 132 coupled by tie rods 133 to the opposite ends of a joint member 134 movably disposed in a rear steering gear box 135. The gear box 135 has an input shaft 136 having an eccentric shaft 137 on its inner end engaging an engaging member 138 on the joint member 134. Rotation of the input shaft 136 is converted by the eccentric shaft 137 and the engaging member 138 to linear motion of the joint member 134 in the transverse direction of the motor vehicle. The output shaft 129 and the input shaft 136 are operatively interconnected by a linkage shaft 139.

The front steering gear box 123 is supported on the motor vehicle body in the same manner as shown in FIGS. 1 and 2, and the mount structure itself for supporting the front steering gear box 123 is the same as that shown in FIGS. 1 and 2.

Figure 7:
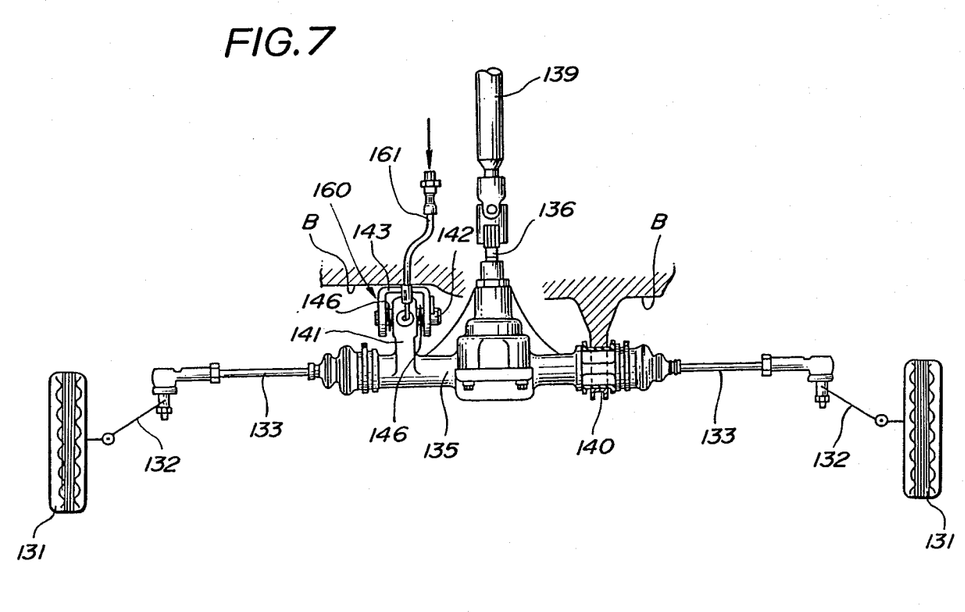
FIG. 7 is a schematic view of a rear steering gear box and components coupled thereto, the rear steering gear box being supported on a motor vehicle body by the mount of the first embodiment.

As illustrated in FIG. 7, the rear steering gear box 135 is mounted at one end thereof on the motor vehicle body B for relative movement with respect thereto through a rubber damper 140. The rear steering gear box 135 has a radial arm 141 near the opposite end thereof. The radial arm 141 is laterally slidable on a support pin 142 supported by a bifurcated bracket 143 with coil springs 146 interposed between the bracket 143 and the radial arm 141.

A supporting rigidity adjusting device 160 which is identical in structure to the device shown in FIG. 2 is disposed between the radial arm 141 and the support pin 142. The device 160 is connected to an oil supply/discharge passage 161.

Figure 8:
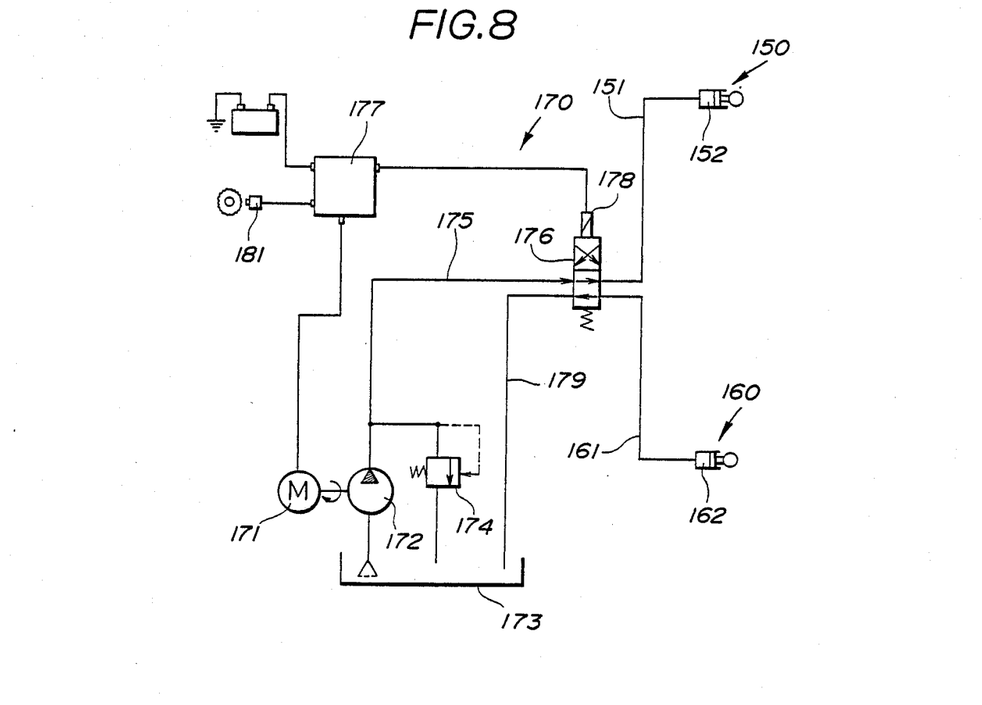
FIG. 8 is a schematic view of a control system for a supporting rigidity adjusting device for the mount of the first embodiment, the control system being incorporated in a front and rear wheel steering apparatus.

FIG. 8 shows a control system 170 for controlling supporting rigidity adjusting devices 150, 160 for the front and rear steering gear boxes. Oil under pressure from an oil pump 172 driven by a motor 171 flows through oil supply/discharge passages 175, 179 between which there is connected a directional control valve 176 that can be shifted by a solenoid 178 controlled by a control unit 177. When the directional control valve 176 is in the illustrated position, oil under pressure is supplied into a cylinder 152 of the front adjusting device 150 and oil under pressure flows from a cylinder 162 of the rear adjusting device 160 via the oil passage 179 back into an oil tank 173. When the directional control valve 176 is in the lower position, oil under pressure is supplied to the rear adjusting device 160 and oil under pressure is removed from the front adjusting device 150. The oil under pressure used in the control system of FIG. 8 may be introduced from a power steering device or the like.

The control unit 177 is supplied with sped information from a car speed sensor 181. When the motor vehicle runs in a low- or medium-speed range below a prescribed speed, the control unit 177 issues an output signal to keep the directional control valve 176 in the illustrated position. When the motor vehicle travels in a high-speed range higher than the prescribed speed, the directional control valve 176 is shifted to and held in the lowered position by the control unit 177.

Figure 9A:
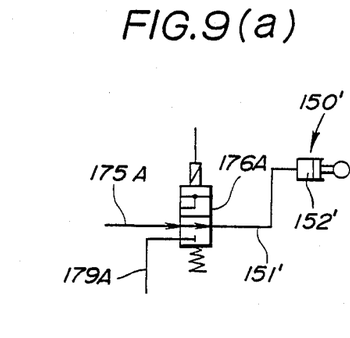
FIGS. 9(a) and 9(b) are schematic views of a modified directional control valve arrangement.
Figure 9B:
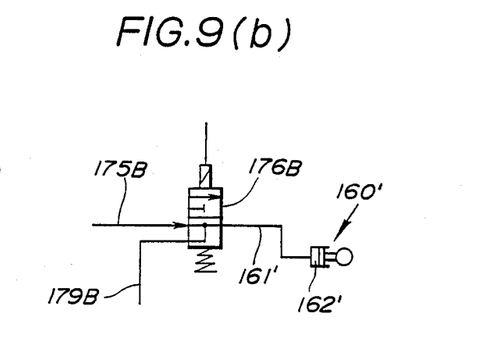

FIGS. 9(a) and 9(b) show a modified directional control valve arrangement. Two oil supply passages 175A, 175B extend from the oil pump, and two oil return passages 179A, 179B extend to the oil tank. A first directional control valve 176A is connected between the oil supply and return passages 175A, 179A for a front adjusting device 150' having a cylinder 152', and a second directional control valve 175B is connected between the oil supply and return passages 175B, 179B for a rear adjusting device 160' having a cylinder 162'. The first and second directional control valves 176A, 176B are separately controlled by the control unit.

While the front and rear steering mechanisms are mechanically interlinked in the embodiment of FIG. 6, the principles of the present invention are also applicable to a motor vehicle having a rear steering mechanism which is electrically or hydraulically controlled on the basis of the speed of travel of the motor vehicle and a front steering angle.

With the supporting rigidity adjusting device of the invention being incorporated in the motor vehicle with steerable front and rear wheels, the rigidity with which the front wheels are supported can be increased at a speed lower than a prescribed sped setting, and the rigidity with which the rear wheels are supported can be increased at a speed equal to or higher than the prescribed speed setting. Therefore, the motor vehicle can be turned more efficiently and smoothly in low- and medium-speed ranges, and can travel straight more stably in a high-speed range. As a consequence, the motor vehicle with steerable front and rear wheels and a supporting rigidity adjusting device according to the present invention can perform its intended capability highly effectively.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A steering gear box mount comprising:
   a steering gear box;
   a motor vehicle body;
   a first resilient member interposed between said motor vehicle body and a portion of said steering gear box for allowing said steering box to move; and
   means interposed between said motor vehicle body and another portion of said steering gear box for limiting allowed movement of said steering gear box;
   said means includes a mechanism for continuously adjusting the allowed movement of said steering gear box; and
   said mechanism comprises:
   support means supporting said steering gear box on said motor vehicle body;
   an attachment portion of said steering gear box which is attached to said motor vehicle body;
   a shaft extending in parallel with said steering gear box through said support means and said attachment portion;
   a second resilient member disposed on opposite sides of said attachment portion and sandwiching the attachment portion in an axial direction of said shaft;
   a movable member disposed on said shaft adjacent to said second resilient member and movable in the axial direction of said shaft, said second resilient member being variable in rigidity in response to movement of said movable member; and
   drive means disposed around and coaxial with said shaft for moving said movable member.

2. A steering gear box mount according to claim 1, wherein said movable member is disposed on one side of said attachment portion and said second resilient member remote from said support means, said movable member cooperating with said support means for acting on said second resilient member.

3. A steering gear box mount according to claim 2, wherein said shaft engages said drive means for being movable axially by the drive means, said movable member engaging said shaft and being movable with said shaft by said drive means in a direction to increase the rigidity of said second resilient member, and also movable with said shaft under the resiliency of said second resilient member in a direction to reduce the rigidity of said second resilient member.

4. A steering gear box mount according to claim 1, wherein a pair of said movable members is disposed on opposite sides of said second resilient member with said attachment portion therebetween, said movable members cooperating with each other for acting on said second resilient member.

5. A steering gear box mount according to claim 1, wherein said shaft is coupled to said drive means for being rotated thereby, said pair of movable members engaging said shaft to move simultaneously toward or away from said attachment portion in response to rotation of said shaft.

6. A steering gear box mount according to claim 1, wherein said motor vehicle body supports a steering gear box for front wheels and a steering gear box for rear wheels, said steering gear box mount supporting at least one of the said steering gear boxes.

7. A steering gear box mount according to claim 6, wherein said means for for said steering gear boxes limits allowed movement of said steering gear box for the front wheels to a larger extent than allowed movement of said steering gear box for the rear wheels at a vehicle speed lower than a prescribed speed, and the limits allowed movement of said steering gear box for the rear wheels to a larger extent than allowed movement of said steering gear box for the front wheels at a vehicle speed higher than the prescribed speed.

* * * * *

UNITED STATES PATENT AND TRADEMARK OFFICE
CERTIFICATE OF CORRECTION

PATENT NO. : 4,823,898

DATED : April 25, 1989

INVENTOR(S) : Masami OGURA et al.

It is certified that error appears in the above-identified patent and that said Letters Patent is hereby corrected as shown below:

Column 1, line 29, delete the semicolon.
Column 7, line 36, change "sped" to --speed--;
         line 68, change "sped" to --speed--.
Column 9, line 10 (Claim 5, line 1), change "1" to --4--.
Column 10, line 7 (Claim 7, line 2), change "for" (second occurrence) to --limiting allowed movement of--;
         line 11 (Claim 7, line 6), delete "the".

Signed and Sealed this

Seventeenth Day of October, 1989

Attest:

DONALD J. QUIGG

Attesting Officer

Commissioner of Patents and Trademarks